Oct. 30, 1962  D. W. YOUMANS ETAL  3,060,968
FLUID PRESSURE CONTROL SYSTEM
Original Filed Aug. 18, 1958  4 Sheets-Sheet 1

INVENTORS
DONALD W. YOUMANS
MELVIN N. TONE

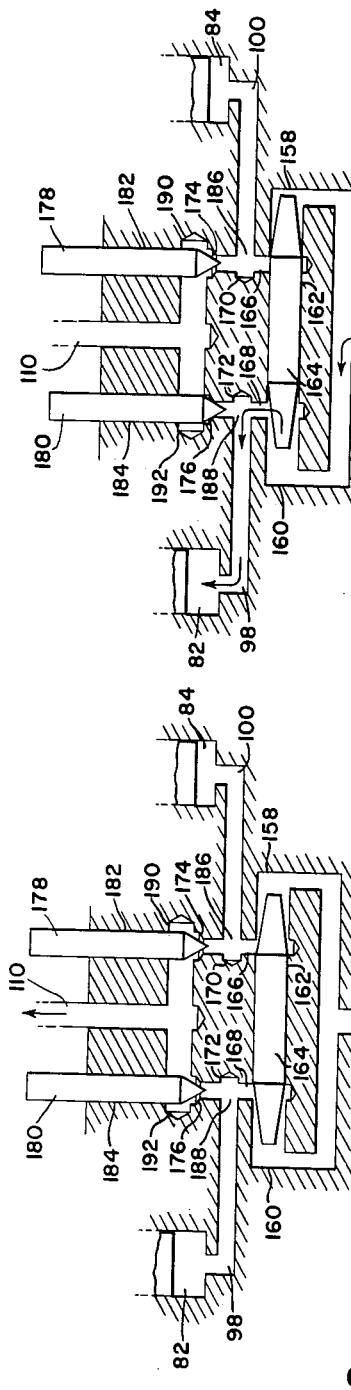
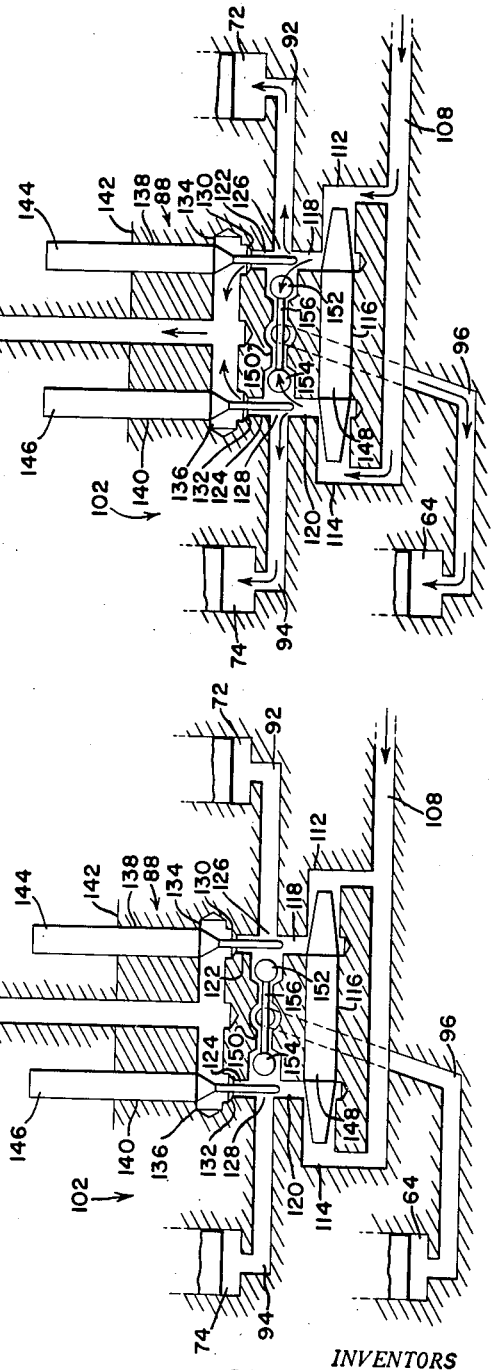
Oct. 30, 1962     D. W. YOUMANS ETAL     3,060,968
FLUID PRESSURE CONTROL SYSTEM
Original Filed Aug. 18, 1958     4 Sheets-Sheet 2
FIG. 3 FORWARD
FIG. 2 NEUTRAL
INVENTORS
DONALD W. YOUMANS
MELVIN N. TONE

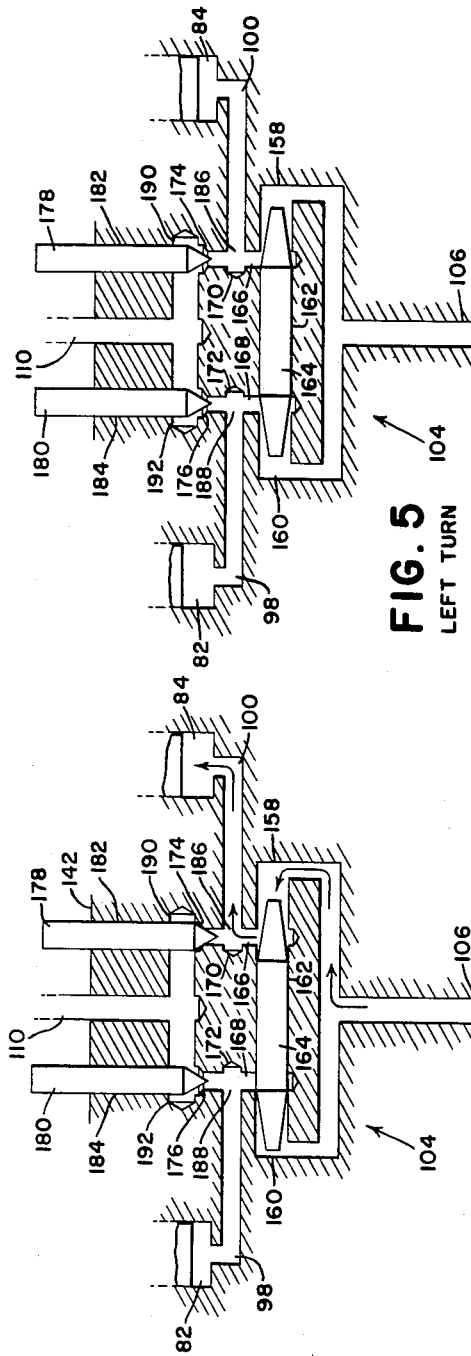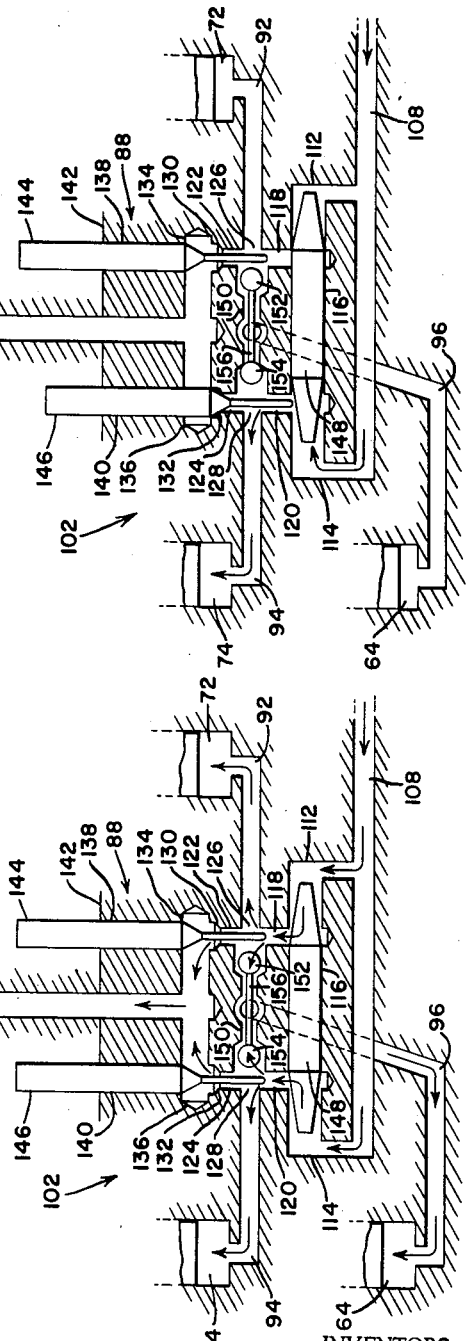

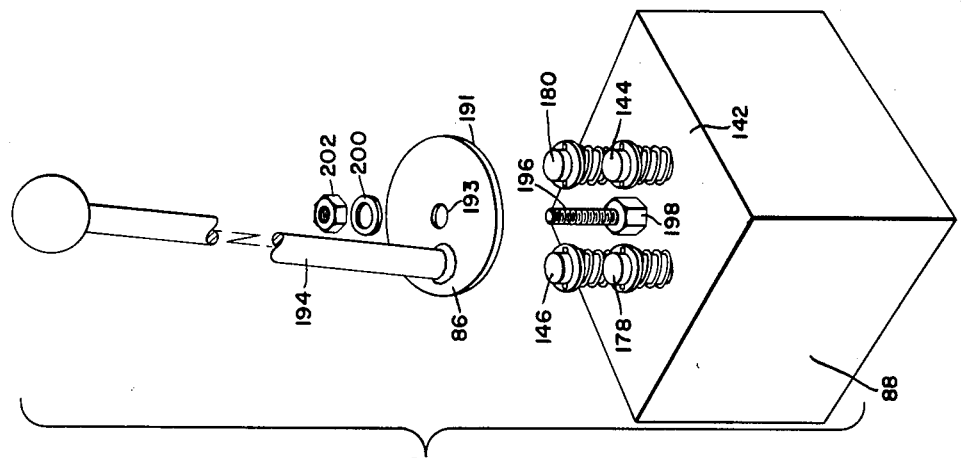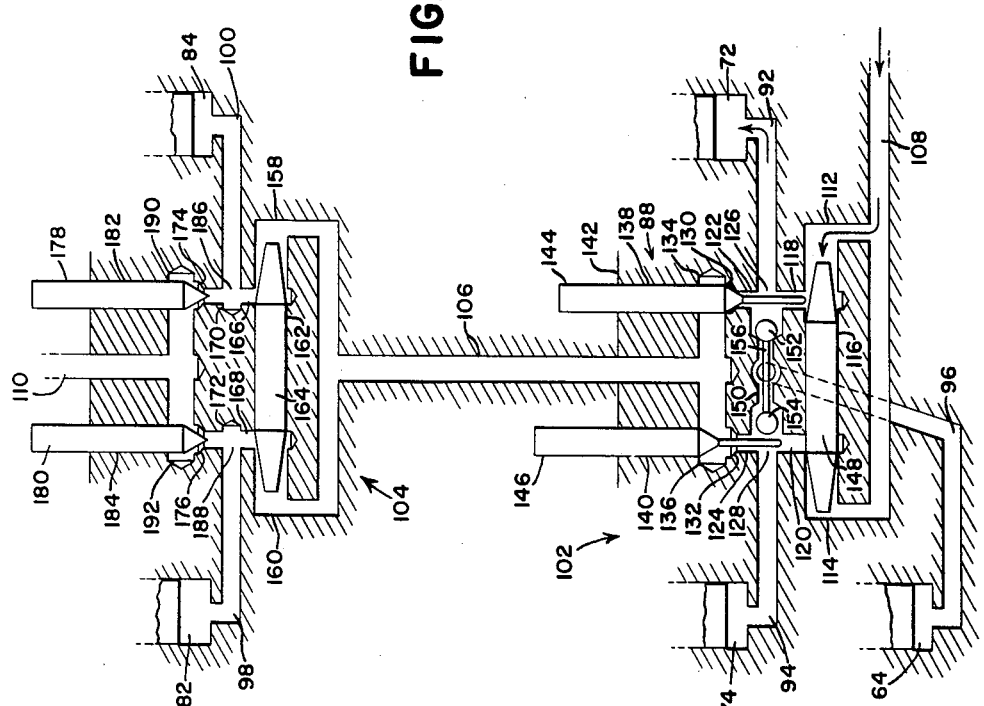

3,060,968
FLUID PRESSURE CONTROL SYSTEM
Donald W. Youmans, Salem, Oreg., and Melvin N. Tone, Dubuque, Iowa, assignors to Deere & Company, Moline, Ill., a corporation of Illinois
Original application Aug. 18, 1958, Ser. No. 755,678, now Patent No. 2,975,851, dated Mar. 28, 1961. Divided and this application July 27, 1960, Ser. No. 45,657
6 Claims. (Cl. 137—622)

This invention relates to a fluid-pressure control system and more particularly to such system as embodied in the control and driving of a vehicle such as a tractor.

This application is a division of copending application Ser. No. 755,678, filed August 18, 1958, now Patent No. 2,975,851.

Viewed in the light of a vehicular background, the control system is preferably applied to a vehicle, such as a tractor, having right and left traction devices, a power plant, driven means including right and left steering clutches respectively for the right and left traction devices, and a direction reverser or forward-reverse means operative alternately to drive the driven means either forwardly or reversely. Vehicles having the general components referred to, as well as the inclusion of a master clutch normally engaged between the power plant and the direction reverser, are well known and primarily the operation involves disengagement of the master clutch to secure speed changes in the driven means, ordinarily comprising a typical sliding gear transmission, plus selection of forward or reverse drive to influence the general direction of travel of the vehicle and optional engagement and disengagement of the steering clutches to accomplish steering of the tractor irrespective of its general direction of travel. Heretofore, these multiple phases of control were effected by several control elements, primarily hand levers for engaging and disengaging the steering clutches and a clutch pedal or the like for engaging and disengaging the master clutch, plus a suitable control for the direction reverser. According to the present invention, these several controls are coordinated by the use of a novel fluid-pressure control system which enables the employment of a single control actuator. It is a feature of the invention to arrange the system so that the control actuator is movable, for direction and steering selection, in the same general direction in which it is desired to travel.

It is a significant object of the invention to provide a novel and improved control system incorporating steering valve means for controlling the steering clutches, direction valve means for controlling the forward-reverse drive means, and an arrangement of valve operators of such nature that the steering valve means may be operated independently of the direction valve means so as to accomplish normal steering of the tractor irrespective of its direction of travel, whereas actuation of the direction valve means incurs simultaneous disengagement of the steering clutches, plus the application of steering brakes if provided, so that the load on the forward-reverse means is removed whereby selection of forward or reverse drive is facilitated. It is a still further object to supplement the control system with means for disengaging the master clutch, whereby selection of direction in the forward-reverse means is further facilitated.

Other objects of the invention reside in the achievement of control of the hydraulic motors for the several driving components in a desirable sequence, preferably by balancing piston size and/or mechanical leverages according to forces desired; the arrangement of a valving system in which the steering and direction valves can be operated in sequence for improving operation of the tractor on tight turns; the general simplification of hydraulic controls, primarily by the use of simple valve plungers requiring a minimum of machining, grinding and close attention to tolerances, plus the proper shaping of the plungers to provide for metering of the flow to build up the pressure required for the controlled component or motor.

The foregoing and other important objects and desirable features inherent in and encompassed by the invention will become apparent as a preferred embodiment thereof is disclosed in detail, by way of example, in the ensuing specification and accompanying sheets of drawings, the several figures of which are described immediately below.

FIG. 2 is an enlarged schematic view, partly in section, showing the fluid-pressure control components in a neutral condition.

FIG. 3 is a similar view showing a forward condition.

FIG. 4 is a similar view showing a reverse condition.

FIG. 5 is a similar view illustrating a left turn condition.

FIG. 6 is a similar view illustrating a right turn condition.

FIG. 7 is an "exploded" view showing the actuator element and valve housing means.

Figure 1:
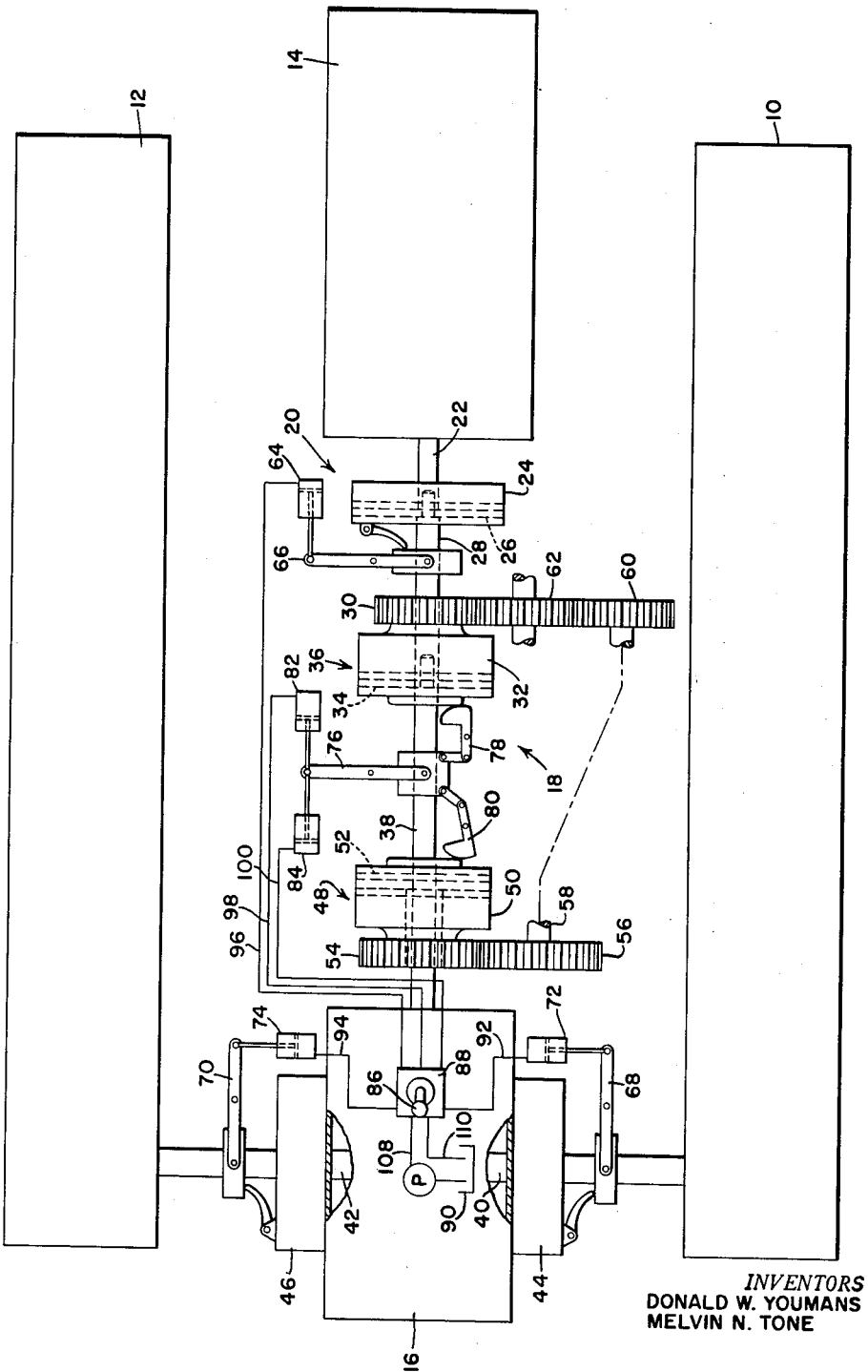
FIG. 1 is a schematic plan view illustrating the application of the inventive control system to a typical vehicle of the track-laying type.

As already indicated, the fluid-pressure control system itself has wide application but is particularly useful in the control and driving of a vehicle. For that purpose, the present illustration should be taken as representative and not limiting.

The track-laying vehicle chosen for purposes of illustration comprises right and left hand traction devices 10 and 12, a power plant 14, such as an internal combustion engine, driven means 16 which may be taken as representative of any conventional multi-speed transmission for driving the traction devices 10 and 12, forward-reverse or direction reverser means 18 and a master clutch 20.

The power plant or engine 14 includes a driving shaft 22 which is connected to and therefore drives the driving member 24 of the master clutch 20. This clutch may be of any conventional construction and includes a driven member 26 keyed or otherwise connected to a fore-and-aft drive shaft 28. The shaft 28 establishes the input for the direction reverser 18 and has keyed thereto a gear 30 and a driving clutch part 32. The clutch part 32 is coaxially related to a driven clutch part 34, and the two parts 32 and 34 may be considered as establishing a forward clutch or forward drive means 36 which, when engaged, establishes driving connection via the parts 34 and 32 between the shaft 28 and a final drive or transmission input shaft 38. The shaft 38 enters the casing of the transmission 16 and is connected in any suitable manner, not material here, to transmission means leading ultimately to right and left hand output shafts 40 and 42. These shafts are connected respectively by right and left steering clutches 44 and 46 to the right and left traction devices 10 and 12. Each of these steering clutches may be of conventional construction such as used in tractors of the track-laying type and accordingly may be considered as including brakes operative in the conventional fashion so that when the clutch is engaged its associated brake is released and vice versa. As is known to those versed in the art, this arrangement enables better control of steering of the tractor, particularly on tight pivot turns.

From the description thus far, it will be seen that the power plant drives the right and left traction devices via the power train setup at 22—20(when engaged)—28—36(when engaged)—38—44 and 46. Disengagement of the right steering clutch 44, for example, will stop the drive to the right traction device while continuing the drive to the left traction device whereby the tractor will turn to the right. Steering to the left is accomplished by reversing the procedure just described.

In order that the direction of the tractor may be readily changed without shifting the transmission 16, the direction reverser 18 includes a second or reverse clutch or drive means 48, illustrated in FIG. 1 in a disengaged condition and including a driving clutch part 50, coaxially journaled on the input shaft 38, and a driven part 52 keyed to the shaft 38. Also coaxially fixed to the driving part 50 is a gear 54 which is in constant mesh with a gear 56. This gear is keyed to one end of a fore-and-aft shaft 58 (here shown in distorted fashion to clarify the illustration) and the other end of the shaft has keyed thereto a gear 60 in constant mesh with a reverse idler gear 62 which is in constant mesh with the gear 30 on the driving part of the forward clutch 36. When the forward clutch 36 is engaged and the reverse clutch 48 is disengaged, as illustrated in FIG. 1, the reverse gearing 54—56—58—60—62—30 is merely driven idly. When the forward clutch is disengaged and the reverse clutch 48 is engaged, reverse drive is established from the gear 30 and via the gears 62, 60, shaft 58 and gears 56 and 54 to the reverse clutch driving part 50 and thence to the reverse clutch driven part 52 for reversing the direction of rotation of the shaft 38. Direction reversers of the general character just described are well known and the details thereof form no material part of the present invention.

The master clutch 20, being conventional, is normally engaged under spring pressure, and is here shown as being disengageable under control of a master clutch fluid-pressure motor 64 connected to any suitable throw-out linkage 66. Likewise, the steering clutches 44 and 46 are normally spring loaded for engagement and are respectively and optionally disengageable by suitable throw-out linkage 68 and 70 under control of right and left steering motors 72 and 74.

The nature of the direction reverser 18 is such that when one clutch thereof is engaged, the other must be disengaged. Accordingly, the throw-out mechanism, indicated generally at 76, includes forward and reverse cams 78 and 80, the former being shown in an over-center position to establish engagement of the forward clutch and the latter being shown in a released condition to establish the disengaged condition of the reverse clutch 48. The throwout means 76 is connected in common to forward and reverse direction motors 82 and 84, and the arrangement is such that when one of the motors is pressurized, the other is de-pressurized, and both cannot be pressurized at the same time. It is of course possible to utilize a direction reverser having a neutral position, but that factor is not material here. Likewise, it will be observed that in place of the two single-acting motors 82 and 84, one two-way motor could be used, pressurizible selectively at opposite ends for achieving the same result. This, like other general characteristics disclosed, could find its equivalent in many forms on the basis of the present teachings.

As stated above, it is a feature of the invention that the drive and control system is influenced by a single control means, and such means as a single actuator element is shown here at 86 in conjunction with valve housing means 88 which is supplied from a pump P and which returns to a reservoir 90. In a typical construction, the reservoir 90 would be part of the transmission casing for the drive means 16. Here again, the details are not material. The valve housing 88 is connected by right and left steering motor lines 92 and 94 respectively to the right and left steering motors 72 and 74. The valve housing means is further connected by a master clutch line 96 to the master clutch motor 64 and by forward and reverse motor lines 98 and 100, respectively, to the forward and reverse motors 82 and 84. For details of the valve housing and the interior construction thereof and association thereof with the several motors, reference is had to FIGS. 2 through 6.

The valve housing and associated control components may be regarded as being divided into steering valve means or a primary circuit portion, indicated in its entirety by the numeral 102, and direction control valve means or a secondary circuit portion indicated in its entirety by the numeral 104. As will be seen, the two portions are interconnected by what may be referred to as a discharge line 106 so that the two portions are in series.

The steering valve means includes a pressure line 108, which is connected to the pump P, and the secondary circuit portion or direction valve means includes a reservoir line 110, which is connected to the reservoir 90.

The pressure line 108 has two branches forming chambers 112 and 114 at opposite ends of a cross passage or bore 116 and this bore connects with a pair of spaced motor inlets 118 and 120 respectively for motor passages 122 and 124. These motor passages have connections respectively at 126 and 128 with the motor lines 92 and 94 for the right and left steering motors 72 and 74, and, additionally, have outlets 130 and 132 respectively to a cross passage which affords right and left branches 134 and 136 connected in common to the lower end of the discharge line 106.

The right and left motor passages 122 and 124 are respectively coaxial with right and left bores 138 and 140 which open at an exterior face 142 of the valve housing 88 and which respectively carry right and left operators or valve members in the form of plungers 144 and 146. These plungers, as best shown in FIG. 7, are spring loaded or otherwise biased to open positions relative to the valve seats afforded by the motor outlets 130 and 132, and the lower ends of the plungers are conical, as shown, for the purpose of seating on and unseating from these valve seats. The purpose of the valve plungers is to selectively and alternately open and close the motor passage outlets 130 and 132 and therefore to incur the transmission of fluid pressure to the right and left steering motors 72 and 74. This is accomplished by depression of the selected plunger 144 or 146, which blocks the valve seat and therefore cuts off the communication between the selected motor passage and the associated discharge line. A normally centrally positioned shuttle valve 148 is carried in the cross bore 116 and operates as a flow divider according to the principle of the U.S. patent to Ernst 1,999,834. Hence, when one of the plungers 144 or 146 is depressed, the pressure rise in the associated motor passage is reflected in the associated flow divider chamber 112 or 114, with the result that the shuttle valve member 148 shifts in the opposite direction to cut off the opposite motor inlet 118 or 120. Consequently, pressure rise is confined to the selected steering motor 72 or 74.

In the instant case, the motor passages 122 and 124 are cross connected at 150 downstream of the flow divider bore 116 and upstream of the discharge line branches 134 and 136, and the master clutch motor line 96 is connected to the cross connection 150. Right and left check valves or balls 152 and 154 are carried in opposite ends of the cross connection 150 and are there loosely retained so as to be normally open except when a pressure rise occurs in one or the other of the motor passages. Hence, the master clutch motor line 96 is normally in communication with both motor passages 122 and 124. However, in the assumed case of depression of the right steering plunger 144, pressure rise occurs in the motor passage 122 and consequently the ball 152 moves to the left and closes the cross connection 150 so that it is not in communication with the motor line 96 for the master clutch. In the opposite sense, pressure rise in the motor passage 124 incident to depression of the plunger 146 causes the ball 154 to close the opposite end of the cross connection 150. On the other hand, there is a situation, which will be described below, in which it is desired to keep the motor line 96 open to both motor passages 122 and 124 when pressure is equal or substantially equal in both motor passages. For this purpose, a cross bar 156 is loosely retained in the cross connecting passage 150 and operates as means to prevent the simultaneous closing of both balls 152 and 154.

When both plungers 144 and 146 are open or undepressed, the discharge line 106 establishes a fluid-transmitting connection between the steering valve means or primary circuit 102 and the direction valve means or secondary circuit 104, and in effect serves as a pressure inlet line for the secondary circuit. This circuit is a substantial duplication of the steering valve circuit, with the exception that it does not include the cross connection 150 and a connection similar to the motor line 96. The upper end of the discharge line 106 has two branches affording opposed chambers 158 and 160 at opposite ends of a cross bore 162 in which is carried a shuttle valve 164 similar to that previously described. This shuttle valve controls right and left inlets 166 and 168 for right and left motor passages 170 and 172, and these passages have outlets in the form of valve seats 174 and 176 respectively for cooperation with the lower conical ends of reverse and forward plungers or valve operators 178 and 180, which are carried respectively in bores 182 and 184 for axial movement downwardly from upwardly biased or spring-loaded positions (FIG. 7). The motor passages 170 and 172 respectively have connections at 186 and 188 with the reverse and forward motor lines 100 and 98. The motor passages, upstream of the connections 186 and 188, are cross connected by branches 190 and 192 of the reservoir line 110. The external ends of the plungers 178 and 180, like those of the steering plungers 144 and 146, open at the exterior face 142 of the valve housing. It will be understood of course that in the sectional illustration of FIGS. 2 through 6, resort has been had to the schematic method in order to clarify the arrangement. In a commercial embodiment, of course, the several passages and bores would be provided in typical manner so that the ultimate valve housing would be a compact unit.

As explained in the Ernst patent, noted above, and here using the primary circuit as an example for the explanation of the operation of the flow divider or shuttle valve 148 the principle is one of maintaining uniformity of fluid flow through the passages 118 and 120 if the resistances encountered by the two motors 72 and 74 are equal. If the resistances thus encountered are unequal, the shuttle valve member 148 will shift in the direction tending to cut down the size of the passage to the motor having the lesser resistance. For example, with both plungers 144 and 146 open, and one or the other of the plungers 178 and 180 closed, the pressure rise in the system will theoretically be equal in the motor passages 122 and 124 (and also in the master clutch motor line 96), and the shuttle valve 148 will be in a central position. A rise in work resistance in the motor 72, for example, will momentarily retard the input flow thereto, causing a "piling up" of fluid in the chamber 112 and a momentary rise in the pressure existing in that chamber. Since this pressure will be higher than the pressure in the opposite chamber 114, the shuttle valve 148 will move to the left, tending to restrict the inlet 120 for the motor passage 124. In a case in which the primary circuit alone is used; that is, one or the other of the plungers 144 and 146 is depressed, the same result will occur except that in this case the shuttle valve 148 will shift farther in the direction cutting off the opposite motor passage inlet, thus connecting the pressure line exclusively to the steering motor selected by the depressed plunger. Thus, the shuttle valve device operates as a proportioning means operating according to the resistances encountered by the motors that are connected in parallel to the pressure line, here the motors 72 and 74 which are connected in parallel to the pressure line 108.

The actuator element 86, briefly noted above, here comprises a base plate 191 having a central aperture 193 therein and further including, eccentrically to the aperture, an upright handle 194 for the convenience of the operator. When the actuator element is assembled with the valve housing 88, it overlies the external ends of the operators or plungers 144, 146, 178 and 180, which are grouped about a central upright axis as represented by a mounting bolt 196 mounted on the valve housing and having a nut 198 the upper face of which is generally part of a sphere. The aperture 193 is loosely centered on the bolt 196 and the assembly is completed by a washer 200 and nut 202. As will be seen, the plungers 144 and 146 lie on a transverse diameter through the axis of the mounting bolt 196, and the plungers 178 and 180 lie on a fore-and-aft diameter through the bolt 196. Since the actuator element is loosely mounted as described, it may be rocked fore-and-aft to depress one or the other of the plungers 178 and 180 and may be rocked laterally or from side to side to depress one or the other of the plungers 144 and 146. Moreover, since the mounting partakes of the nature of the universal connection, the actuator element may also be rocked diagonally to the directions just described, and it is therefore capable of depressing two adjacent plungers simultaneously. For example, the actuator element may be rocked to the right rear, depressing both plungers 178 and 144. Likewise, it may be rocked to the right front, depressing plungers 144 and 180. Depression of both plungers 178 and 146 results from rocking of the element to the left rear, and rocking of the element to the left front results in depression of the two plungers 146 and 180. Also, for reasons that will presently appear, the actuator element may be operated in a combined rocking and rolling motion so as generally to rotate as an element of an inverted cone about the generally spherical surface of the mounting nut 198.

*Operation*

FIG. 2 represents what may be considered the neutral condition of the system. However, in this regard it must be noted that since the master clutch 20 and right and left steering clutches 44 and 46 are of the type that are always biased into engagement, this much of the drive will be established. It must be further observed that the direction reverser involves the two clutches 36 and 48, one or the other of which, according to the present disclosure, is engaged while the other is disengaged. The situation would be different if the direction reverser included a neutral position. However, this does not affect the basic operation. Therefore, the neutral condition disclosed here should be considered as involving a neutral status in the transmission or final drive means 16.

With the above in mind, let it be assumed that the actuator element 86 is rocked directly forwardly to depress the forward plunger 180 (FIG. 3). The plunger 180 thus seats on the valve seat 176 at the outlet for the forward motor passage 172, and the resulting pressure rise in the system causes the shuttle valve 164 to shift to the right, cutting out the reverse motor passage 166 and simultaneously transmitting fluid pressure to the right and left steering motors and to the master clutch motor. In this situation, assuming that the resistances in the steering motors 72 and 74 are equal, the shuttle valve 148 in the primary circuit will retain its central position. Since the pressure is assumed to be equal in the motor passages 122 and 124, the cross connection 150 to the master clutch motor line 96 will be open, because the cross bar 156 prevents both balls 152 and 154 from closing simultaneously. Therefore, the result is that the master clutch 20, as well as both steering clutches 44 and 46 are disengaged. At this time, a speed may be selected in the transmission 16, and the actuator element 86 returned to its central position, which will be achieved by release of manual pressure thereon and the tendency of the plunger 180, under its spring or biasing means, to return to its open or neutral position. When the plunger 180 is open, the pressure line 108 is connected ultimately to the reservoir line 110 and the master and steering clutches, being internally biased for engagement, will reengage, and the tractor will travel forwardly.

Straight-ahead reverse is achieved by rocking the element 86 to the rear, causing depression of the reverse plunger 178 (FIG. 4), whereupon the pressure built up in the system causes simultaneous disengagement of the master clutch 20 and right and left steering clutches 44 and 46; although, the pressure requirements may be so proportioned that the master clutch 20 will disengage prior to disengagement of the steering clutches 44 and 46.

In the previously described situation of establishing the drive for straight-ahead forward, the forward clutch 36 was assumed to be engaged and consequently, the transmission of fluid pressure to the forward clutch motor 82 was without consequence. However, in the straight-ahead reverse, the rise in pressure results of course in transmission of pressure to the reverse motor 84 so that the result is engagement of the reverse clutch 48 and simultaneous disengagement of the forward clutch 36, because of the mechanical interconnection at 76. As previously pointed out, the forward and reverse motors 82 and 84 could be combined as a single two-way motor, without departure from the principles of the present invention.

At any rate, the coincident disengagement of the master and steering clutches 20, 44 and 46, removes the driving load from the direction reverser and facilitates change from forward drive to reverse drive. This feature is present also in the transition from reverse to forward.

FIG. 5 illustrates the achievement of a left turn, which is accomplished by rocking the actuator or control element 86 to the left, depressing only the left steering plunger 146 and creating a pressure rise in only the motor passage 124, and disengaging only the left steering clutch 46 because the left steering motor 74 is pressurized exclusively of the other motors. It will be noted that the ball 154 closes the left hand end of the cross connection 150, since there is no pressure in the opposite motor passage 122 and the ball 152 is forcibly retained open by the cross bar 156. Therefore, disengagement of the master clutch 20 is not an incident to disengagement of either steering clutch. When the left steering clutch 46 is disengaged, the right steering clutch remains engaged and therefore the right track or traction device 10 will be driven and the left traction device 12 will not be driven. In typical instances in which the steering clutches incorporate brakes which are applied when the clutches are disengaged, the brake in the left clutch will of course be applied and will hold the left traction device so as to facilitate turning.

Similarly, in the forward and reverse changes, the brakes that are applied simultaneously with disengagement of the two steering clutches will prevent the tractor from rolling while the change is made from forward to reverse or vice versa.

FIG. 6 illustrates a right turn, which will be clear, on the basis of the foregoing, without further description.

Since the system partakes of instantaneous response, it lends itself particularly to the control of a tractor such as illustrated, imparting to the tractor great maneuverability, all under the control of a single actuator such as 86. Because of the ability of the actuator to depress two adjacent plungers simultaneously and because of its universal mounting, it may be simultaneously rocked and rolled about its mount for the purpose, for example, of turning the tractor completely around in a close space. For example, if the operator desires to rotate the tractor in a clockwise direction, he can slowly rotate the actuator element 86 in the same direction. The result would be rotating the right track rearwardly and then rotating the left track forwardly alternately. This has substantially the effect of simultaneously counter-rotating the tracks, and, in the circumstances and considering the advantages obtained from the single control element 86, is not a material disadvantage.

It should also be noted that the tractor may be stopped by moving the element 86 in the direction of travel. For example, if the tractor is moving forwardly, the forward clutch 36 is engaged and the element 86 is in neutral. When the element 86 is rocked forwardly to depress the forward clutch plunger 180, the forward clutch motor is pressurized, having no further effect on the forward clutch, but what is significant is that the master clutch and both steering clutches are disengaged. Hence, the tractor stops. The same is true in the opposite phase to stop the reversely traveling tractor.

Conclusion

As will be seen from the foregoing, the control system, especially as applied to a vehicle of the general character illustrated, is simple and versatile and affords instantaneous responsiveness of the control motors. As already indicated, the control system has wider application but has particular advantages in connection with the control of a vehicle.

Features and advantages other than those categorically enumerated will readily occur to those versed in the art, as will various modifications and alterations in the preferred embodiment disclosed, all of which may be achieved without departure from the spirit and scope of the invention.

What is claimed is:

1. A fluid-pressure control system, comprising: valve housing means having a pressure line, a discharge line, a reservoir line, a pair of first motor passages respectively having inlets connected in parallel to the pressure line and outlets connected in parallel to the discharge line and each motor passage having a motor connection intermediate its said inlet and outlet, a pair of second motor passages respectively having inlets connected in parallel to the discharge line downstream of the first motor passages, and outlets connected in parallel to the reservoir line and each second motor passage having a motor connection intermediate its said inlet and outlet; first shuttle valve means normally operative to establish communication between the pressure line and the inlets of both first motor passages and automatically operative, in response to pressure rise incident to blocking of either first motor passage outlet, to close the opposite first motor inlet; second shuttle valve means normally operative to establish communication between the discharge line and the second motor passage inlets and automatically operative in response to pressure rise incident to blocking of either second motor passage outlet to close the opposite second motor passage inlets; and a plurality of individually movable valve members carried by the valve housing means in neutral positions opening all motor passage outlets and operative selectively and individually to close said outlets.

2. The invention defined in claim 1, in which the valve housing means has an exterior face and four parallel bores leading inwardly from said face and respectively meeting the four motor passage outlets, and the valve members comprise four plungers respectively axially shiftable in said bores and biased to their neutral positions.

3. The invention defined in claim 1, including: an additional motor passage in said housing means connected to at least one of the motor passages intermediate the inlet and outlet of said one motor passage.

4. The invention defined in claim 1, including: an additional motor passage in said housing means having a connection in parallel to both first motor passages intermediate the inlet and outlet of said first motor passages; and a pair of normally open, opposed check valves in said connection, each check valve being arranged to close and to cut off said additional motor passage from its associated first motor passage in response to pressure rise in said associated first motor passage when the associated valve member is actuated to close the associated first motor passage outlet; and means operative between said check valves to prevent closing of both check valves simultaneously.

5. A fluid-pressure control system of the class described, comprising: means providing a pressure line, a pair of first motor lines, first flow divider means connecting the motor lines in parallel to the pressure line and including an automatically shiftable member responsive to motor line resistance for proportioning flow between said motor lines, an outlet line connected to the motor lines downstream of the flow divider means, a pair of second motor lines, second flow divider means connecting the second motor lines in parallel to the outlet line and including an automatically shiftable member responsive to second motor line resistance for proportioning flow between said second motor lines, and a reservoir line connected to the second motor lines upstream of the second flow divider means; first control valve means carried by the housing means and neutrally positioned to open both first motor lines to the outlet and actively positionable selectively to cut off the outlet line from either first motor line to cause the first flow divider means to connect the pressure line exclusively to the selected first motor line; and second control valve means carried by the housing means and neutrally positioned to open both second motor lines to the reservoir line and actively positionable selectively, while the first control valve means is neutrally positioned, to cut off the reservoir line from either second motor line to cause the second flow divider means to connect the outlet exclusively to the selected second motor line and to incur a pressure rise in the system upstream of said selected second motor line such as to pressurize both first motor lines as well as said selected second motor line.

6. The invention defined in claim 5, including: an additional motor line in the housing means connected in parallel to the first motor lines intermediate the first flow divider means and the outlet line so as to be pressurized along with the first motor lines when the second valve means is operated; and check valve means in and operative to close said additional motor line when only the first control valve means is operated.

References Cited in the file of this patent

UNITED STATES PATENTS 2,346,820    Casler et al. _____ Apr. 18, 1944